(12) United States Patent
Kimura et al.

(10) Patent No.: US 6,255,436 B1
(45) Date of Patent: Jul. 3, 2001

(54) AROMATIC POLYCARBONATE

(75) Inventors: Masatoshi Kimura, Yokkaichi; Michio Kawai, Tokyo; Hiroshi Takeguchi, Yokkaichi; Hiroshi Nakano, Hiratsuka; Masayuki Nakajima; Katsushige Hayashi, both of Tsukuba, all of (JP)

(73) Assignees: Mitsubishi Chemical Corporation; Mitsubishi Gas Chemical Company, Inc., both of Tokyo (JP)

( * ) Notice: Subject to any disclaimer, the term of this patent is extended or adjusted under 35 U.S.C. 154(b) by 0 days.

(21) Appl. No.: 09/444,933

(22) Filed: Nov. 22, 1999

(30) Foreign Application Priority Data

Nov. 24, 1998 (JP) .................................................. 10-332933

(51) Int. Cl.⁷ .................................................. C08G 64/00
(52) U.S. Cl. ............................................ 528/196; 528/198
(58) Field of Search ...................................... 528/196, 198

(56) References Cited

U.S. PATENT DOCUMENTS 4,789,730  12/1988  Priddy .................................. 528/498

FOREIGN PATENT DOCUMENTS

| | | |
|---|---|---|
| 0524380 | 1/1993 | (EP) . |
| 0708128 | 4/1996 | (EP) . |
| 0719815 | 7/1996 | (EP) . |
| 0719816 | 7/1996 | (EP) . |
| 62-190220 | 8/1987 | (JP) . |
| 62-190221 | 8/1987 | (JP) . |
| 62-190222 | 8/1987 | (JP) . |
| 002135120 | 4/1995 | (JP) . |
| 7-126374 | 5/1995 | (JP) . |

Primary Examiner—Terressa M. Boykin
(74) Attorney, Agent, or Firm—David G. Conlin; Lisa Swiszcz Hazzard; Dike, Bronstein, Roberts & Cushman, LLP

(57) ABSTRACT

An aromatic polycarbonate of the present invention is produced by reacting an aromatic dihydroxy compound with a compound capable of introducing a carbonate bond, and has a viscosity-average molecular weight of 12,000 to 40,000 and a content of a cyclic oligomer represented by the formula (1) of not more than 1,000 ppm, in which the percentage of the content of said cyclic oligomer represented by the formula (1) based on the total contents of the cyclic oligomer represented by the formula (1), an oligomer represented by the formula (2) and an oligomer represented by the formula (3) satisfies the following relational formula [I]:

$$0 < \frac{(1)}{(1)+(2)+(3)} \times 100 < 3.6 \times 10^{-8} \times (Mv)^2 \quad [\text{I}]$$

wherein (1), (2) and (3) are contents of the oligomers represented by the above formulae (1), (2) and (3), respectively; and Mv is a viscosity-average molecular weight of said aromatic polycarbonate.

6 Claims, 1 Drawing Sheet

AROMATIC POLYCARBONATE

BACKGROUND OF THE INVENTION

The present invention relates to an aromatic polycarbonate and in particular, to an aromatic polycarbonate which is improved in color tone and heat resistance.

Polycarbonate resins have been extensively used in various application fields because of excellent impact resistance, transparency or the like. Among others, these polycarbonate resins are especially useful as transparent materials such as optical discs, sheets, molding materials, alternate materials for glass products or the like. However, the polycarbonate resins have to be kneaded and molded at a high temperature of 250 to 380° C. due to a high melting viscosity thereof. Therefore, there arises such a problem that these resins tend to be discolored when kneaded with additives and molded.

In order to solve the above problem, in the case where polycarbonate resins are produced by a so-called interfacial polymerization method of reacting an aromatic dihydroxy compound with phosgene, it has been attempted to improve the heat resistance of these resins by reducing an amount of methylene chloride used as a solvent, an amount of chlorine components derived from phosgene, or the like. On the other hand, in the transesterification method of heat-reacting the aromatic dihydroxy compound with the carbonic acid diester compound under a reduced pressure, it has been attempted to improve properties of the obtained polycarbonate resins by reducing a content of the carbonic acid diester as a raw material, deactivating the catalyst, etc. (Japanese Patent Application Laid-Open (KOKAI) No. 7-126374(1995)). However, these methods have failed to obtain polycarbonate resins having a sufficient thermal stability. Therefore, there has been demanded a further improvement in the production of polycarbonate.

As a result of the present inventors' earnest studies concerning the improvement of color tone, heat resistance and the like of polycarbonate resins for solving the above problems, it has been found that by reducing the content of a cyclic oligomer which is produced under specific conditions upon the production of polycarbonate resins, to not more than a specific value, and reducing the percentage of the cyclic oligomer content based on a total oligomer content, to not more than a specific percentage, the obtained polycarbonate resins can be considerably improved in color tone and heat resistance. The present invention has been attained on the basis of the finding.

SUMMARY OF THE INVENTION

It is an object of the present invention to provide a polycarbonate resin which is improved in color tone, heat resistance and the like.

In an aspect of the present invention, there is provided an aromatic polycarbonate which is produced by reacting an aromatic dihydroxy compound with a compound capable of introducing a carbonate bond, and has a viscosity-average molecular weight of 12,000 to 40,000 and a content of a cyclic oligomer represented by the following formula (1) of not more than 1,000 ppm, and in which the percentage of the content of said cyclic oligomer represented by the formula (1) based on the total contents of said cyclic oligomer represented by the formula (1), an oligomer represented by the following formula (2) and an oligomer represented by the following formula (3) satisfies the following relational formula [I]:

$$0 < \frac{(1)}{(1)+(2)+(3)} \times 100 < 3.6 \times 10^{-8} \times (Mv)^2 \quad [\mathrm{I}]$$

wherein (1), (2) and (3) are contents of the oligomers represented by the formulae (1), (2) and (3), respectively; and Mv is a viscosity-average molecular weight of said aromatic polycarbonate.

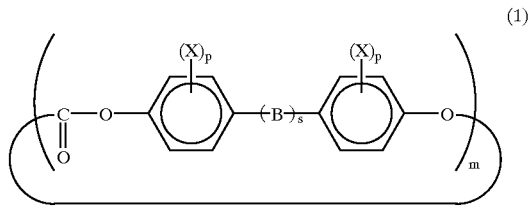

wherein B is a divalent group selected from the group consisting of a halogen-substituted or unsubstituted $C_1$ to $C_{15}$ hydrocarbon group, O, S, CO, SO and $SO_2$; X is a monovalent group selected from the group consisting of a halogen atom, a substituted or unsubstituted $C_1$ to $C_{14}$ aliphatic group, a substituted or unsubstituted $C_6$ to $C_{18}$ aromatic group, a $C_1$ to $C_8$ oxyalkyl group and a $C_6$ to $C_{18}$ oxyaryl group; m is an integer of 2 to 8; p is an integer of 0 to 4; s is an integer of 0 or 1; and X's and p's are respectively the same or different.

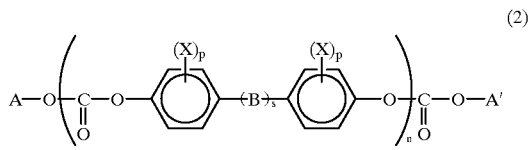

wherein A and A' are independently a monovalent group selected from the group consisting of a substituted or unsubstituted $C_1$ to $C_{18}$ aliphatic group and a substituted or unsubstituted $C_6$ to $C_{18}$ aromatic group, and may be the same or different; n is an integer of 1 to 7; and B, X, p and s have the same meanings as set forth in the above formula (1).

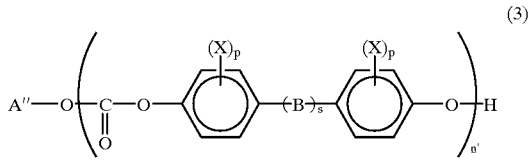

wherein A" is a monovalent group selected from the group consisting of a substituted or unsubstituted $C_1$ to $C_{18}$ aliphatic group and a substituted or unsubstituted $C_6$ to $C_{18}$ aromatic group; n' is an integer of 1 to 7; and B, X, p and s have the same meanings as set forth in the above formula (1).

DETAILED DESCRIPTION OF THE INVENTION

Figure 1:
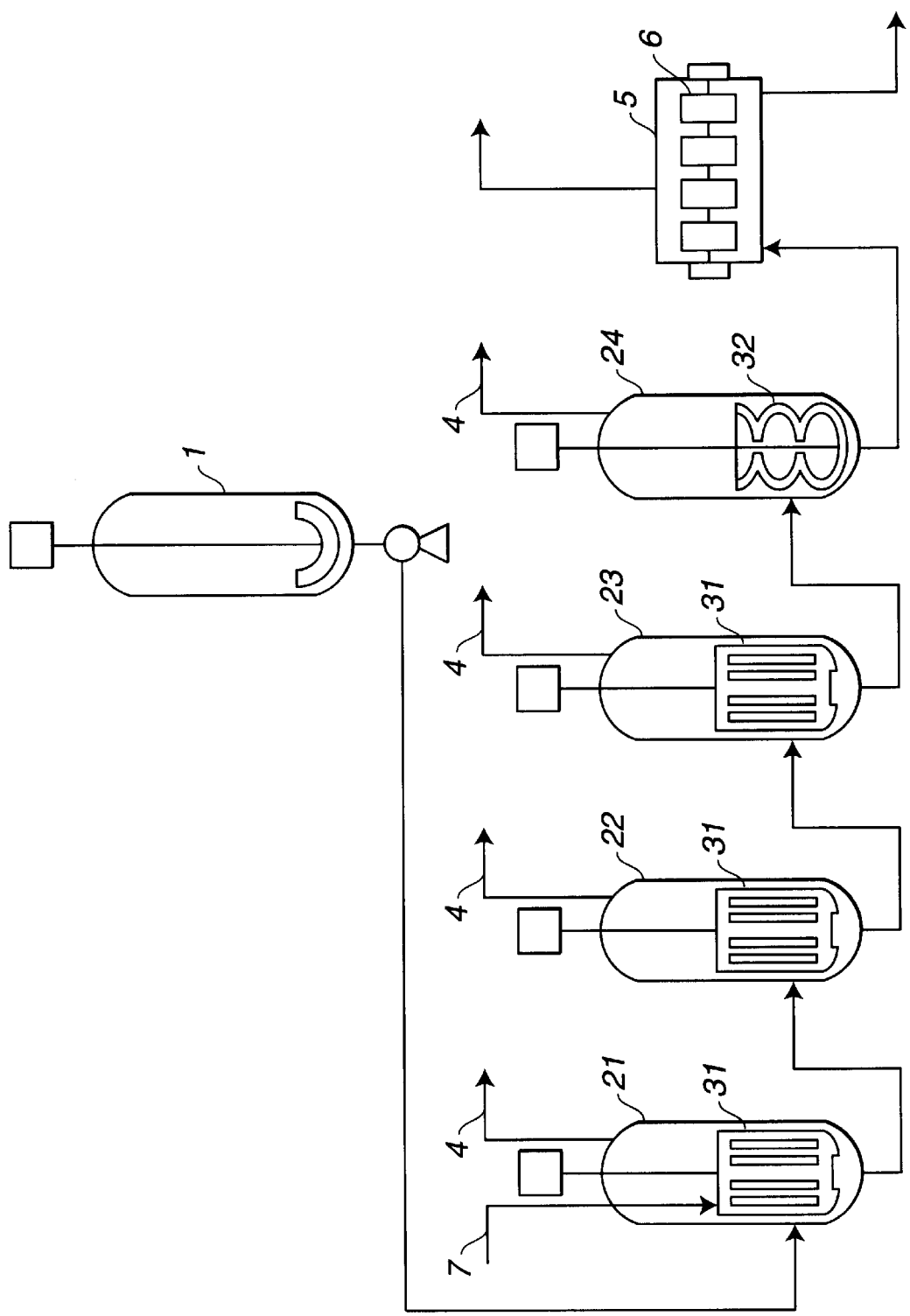
FIG. 1 is a flow sheet showing an example of the process for producing polycarbonate according to the present invention.

The present invention will be described in detail below.

The aromatic polycarbonate according to the present invention can be produced by known methods such as an interfacial polycondensation method, a transesterification method, etc., using an aromatic dihydroxy compound and a compound capable of introducing a carbonate bond as raw materials. Among these methods, the use of the transesterification method is preferred.

As the compound capable of introducing a carbonate bond, there may be exemplified phosgene, carbonic acid diesters or the like. The carbonic acid diesters are represented by the following formula (4):

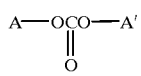

(4)

wherein A and A' are independently a monovalent group selected from the group consisting of a substituted or unsubstituted $C_1$ to $C_{18}$ aliphatic group and a substituted or unsubstituted $C_6$ to $C_{18}$ aromatic group, and may be the same or different.

Examples of the carbonic acid diesters represented by the above formula (4) may include dimethyl carbonate, diethyl carbonate, di-t-butyl carbonate, diphenyl carbonate, substituted diphenyl carbonate such as ditolyl carbonate or the like. Among them, the use of diphenyl carbonate or substituted diphenyl carbonate is preferred. Especially, the use of diphenyl carbonate is more preferred. These carbonic acid diesters may be used singly or in the form of a mixture of any two or more thereof.

In addition, together with the above compound capable of introducing a carbonate bond, dicarboxylic acids or dicarboxylic esters can be used in an amount of preferably not more than 50 mol %, more preferably not more than 30 mol %. As the dicarboxylic acids or dicarboxylic esters, there may be exemplified terephthalic acid, isophthalic acid, diphenyl terephthalate, diphenyl isophthalate or the like. When the dicarboxylic acid or dicarboxylic ester is used together with the carboxylic diester, polyester carbonate can be produced.

The aromatic dihydroxy compound as another raw material is represented by the following formula (5):

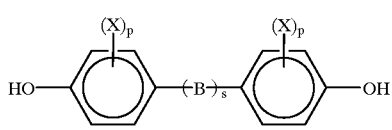

(5)

wherein B is a divalent group selected from the group consisting of a halogen-substituted or unsubstituted $C_1$ to $C_{15}$ hydrocarbon group, O, S, CO, SO and $SO_2$; X is a monovalent group selected from the group consisting of a halogen atom, a substituted or unsubstituted $C_1$ to $C_{14}$ aliphatic group, a substituted or unsubstituted $C_6$ to $C_{18}$ aromatic group, a $C_1$ to $C_8$ oxyalkyl group and a $C_6$ to $C_{18}$ oxyaryl group; p is an integer of 0 to 4; s is an integer of 0 or 1; and X's and p's are respectively the same or different.

Examples of the aromatic dihydroxy compounds represented by the above formula (5) may include 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-3,5-dichlorophenyl)propane, 2,2-bis(4-hydroxy-3,5-dibromophenyl)propane, 2,2-bis(4-hydroxyphenyl)pentane, 2,4'-dihydroxy-diphenyl methane, bis(4-hydroxyphenyl) methane, bis(4-hydroxy-3-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis (4-hydroxyphenyl)sulfide, 4,41-dihydroxydiphenyl ether, 4,41-dihydroxy-3,31-dichlorodiphenyl ether, 4,4'-dihydroxy-2,5-diethoxydiphenyl ether or the like. Among them, the use of 2,2-bis(4-hydroxyphenyl)propane is preferred. These aromatic dihydroxy compounds may be used singly or in the form of a mixture of any two or more thereof to make copolymers, if required.

The mixing ratio of the carbonic acid diester to the aromatic dihydroxy compound may be varied and determined depending upon the molecular weight of the aimed aromatic polycarbonate and the amount of terminal hydroxyl groups thereof. The amount of the terminal hydroxyl groups has a large influence on heat stability, hydrolysis stability, color tone, etc., of the obtained polycarbonate products. In order to impart practically useful properties to the obtained polycarbonate, the amount of terminal hydroxyl groups is usually not more than 1,000 ppm, preferably not more than 800 ppm, more preferably not more than 700 ppm.

In the case where the polycarbonate is produced by the transesterification method, when the amount of terminal hydroxyl groups is too small, the molecular weight of polycarbonate produced cannot be increased, and the color tone thereof is deteriorated. Therefore, the amount of terminal hydroxyl groups is usually not less than 100 ppm, preferably not less than 200 ppm, more preferably not less than 300 ppm.

Accordingly, the carbonic acid diester may be generally used in an equimolar amount or higher based on one mole of the aromatic dihydroxy compound. More specifically, the carbonic acid diester may be used in an amount of usually 1.01 to 1.30 moles, preferably 1.01 to 1.20 moles based on one mole of the aromatic dihydroxy compound.

When the aromatic polycarbonate is produced by the transesterification method, a transesterification catalyst is usually used therein. The transesterification catalyst used in the present invention is not particularly restricted, but there may be mainly used alkali metal compounds and/or alkaline earth metal compounds. These alkali metal compounds and/or alkaline earth metal compounds may be used together with basic compounds as an auxiliary catalyst component such as basic boron compounds, basic phosphorus compounds, basic ammonium compounds or amine-based compounds. These catalysts may be used singly or in the form of a mixture of any two or more thereof.

The amount of the catalyst used is usually $1 \times 10^{-9}$ to $1 \times 10^{-3}$ mole based on one mole of the aromatic dihydroxy compound. In particular, the alkali metal compounds or alkaline earth metal compounds may be used in an amount of usually $1 \times 10^{-9}$ to $1 \times 10^{-4}$ mole, preferably $1 \times 10^{-8}$ to $1 \times 10^{-5}$ mole based on one mole of the aromatic dihydroxy compound, and the basic compounds such as basic boron compounds, basic phosphorus compounds, basic ammonium compounds or amine-based compounds may be used in an amount of usually $1 \times 10^{-9}$ to $1 \times 10^{-3}$ mole, preferably $1 \times 10^{-7}$ to $1 \times 10^{-4}$ mole based on one mole of the aromatic dihydroxy compound. When the amount of the catalyst used is less than each lower limit value, it is difficult to exhibit a polymerization activity enough to produce a polycarbonate having the aimed molecular weight and the aimed amount of terminal hydroxyl groups. When the amount of the catalyst used is more than each upper limit value, the obtained polycarbonate disadvantageously may undergo the increase in amount of the cyclic oligomer as described hereinafter, discoloration, low heat resistance, low hydrolysis resistance, increase in amount of foreign substances due to gel generation, or the like.

As the alkali metal compounds, there may be exemplified inorganic alkali metal compounds such as hydroxides, hydrogen carbonates, carbonates, hydrogen phosphates or phenyl phosphates of lithium, sodium, potassium, rubidium or cesium; organic alkali metal compounds, e.g., alkali metal salts of organic acids such as acetic acid, stearic acid or benzoic acid, alkali metal salts of alcohols such as methanol or ethanol, or alkali metal salts of phenols such as phenol or bisphenol A; or the like.

As the alkaline earth metal compounds, there may be exemplified inorganic alkaline earth metal compounds such as hydroxides, hydrogen carbonates or carbonates of beryllium, calcium, magnesium, strontium or barium; organic alkaline earth metal compounds, e.g., alkaline earth metal salts of organic acids such as acetic acid, stearic acid or benzoic acid, alkaline earth metal salts of alcohols, or alkaline earth metal salts of phenols; or the like.

Specific examples of the basic boron compounds may include sodium salts, potassium salts, lithium salts, calcium salts, magnesium salts, barium salts or strontium salts of boron compounds such as tetramethyl boron, tetraethyl boron, tetrapropyl boron, tetrabutyl boron, trimethylethyl boron, trimethylbenzyl boron, trimethylphenyl boron, triethylmethyl boron, triethylbenzyl boron, triethylphenyl boron, tributylbenzyl boron, tributylphenyl boron, tetraphenyl boron, benzyltriphenyl boron, methyltriphenyl boron or butyltriphenyl boron, or the like.

As the basic phosphorus compounds, there may be exemplified triethyl phosphine, tri-n-propyl phosphine, triisopropyl phosphine, tri-n-butyl phosphine, triphenyl phosphine, quaternary phosphonium salts or the like.

As the basic ammonium compounds, there may be exemplified tetramethyl ammonium hydroxide, tetraethyl ammonium hydroxide, tetrapropyl ammonium hydroxide, tetrabutyl ammonium hydroxide, trimethylethyl ammonium hydroxide, trimethylbenzyl ammonium hydroxide, trimethylphenyl ammonium hydroxide, triethylmethyl ammonium hydroxide, triethylbenzyl ammonium hydroxide, triethylphenyl ammonium hydroxide, tributylbenzyl ammonium hydroxide, tributylphenyl ammonium hydroxide, tetraphenyl ammonium hydroxide, benzyltriphenyl ammonium hydroxide, methyltriphenyl ammonium hydroxide, butyltriphenyl ammonium hydroxide or the like.

As the amine-based compounds, there may be exemplified 4-aminopyridine, 2-aminopyridine, N,N-dimethyl-4-amino-pyridine, 4-diethylaminopyridine, 2-hydroxypyridine, 2-methoxypyridine, 4-methoxypyridine, 2-dimethylamino-imidazole, 2-methoxyimidazole, imidazole, 2-mercapto-imidazole, 2-methylimidazole, aminoquinoline or the like.

Among these catalysts, the alkali metal compounds, the basic ammonium compounds and the basic phosphorus compounds are practically preferred, and the alkali metal compounds are more preferred.

The polycarbonate according to the present invention can be produced by reacting the above-described compound capable of introducing a carbonate bond with the above-described aromatic dihydroxy compound usually in the presence of the above-described transesterification catalyst, and has a viscosity-average molecular weight of usually 12,000 to 40,000. When the viscosity-average molecular weight is less than 12,000, the obtained polycarbonate may be deteriorated in mechanical properties. When the viscosity-average molecular weight is more than 40,000, the obtained polycarbonate may be deteriorated in moldability.

In the aromatic polycarbonate according to the present invention, the content of the cyclic oligomer represented by the formula (1) is required to be not more than 1,000 ppm, preferably 700 ppm, more preferably 550 ppm. When the content of the cyclic oligomer is more than 1,000 ppm, the obtained polycarbonate tends to be discolored, and deteriorated in heat resistance, hydrolysis resistance or the like. Although the reason therefor is not clearly known, it is considered that since the cyclic oligomer exhibits a high reactivity, the large content of the cyclic oligomer tends to produce colored components or accelerate the hydrolysis reaction under a high temperature condition.

Further, even though the content of the cyclic oligomer is not more than 1,000 ppm, the properties of the obtained polycarbonate is adversely affected when the percentage of the content of the cyclic oligomer represented by the formula (1) based on the total content of oligomers including specific linear oligomers is more than a specific value. Accordingly, it is required that the percentage of the content of the cyclic oligomer represented by the formula (1) based on the total content of oligomers represented by the following formulae (1), (2) and (3) satisfies the following relational formula [I]:

$$0 < \frac{(1)}{(1)+(2)+(3)} \times 100 < 3.6 \times 10^{-8} \times (Mv)^2 \quad [I]$$

wherein (1), (2) and (3) are contents of the oligomers represented by the following formulae (1), (2) and (3), respectively; and Mv is a viscosity-average molecular weight of the obtained aromatic polycarbonate.

Formula (1):

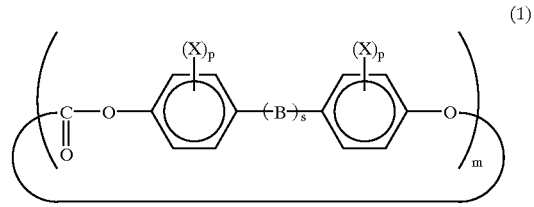

wherein B is a divalent group selected from the group consisting of a halogen-substituted or unsubstituted $C_1$ to $C_{15}$ hydrocarbon group, O, S, CO, SO and $SO_2$; X is a monovalent group selected from the group consisting of a halogen atom, a substituted or unsubstituted $C_1$ to $C_{14}$ aliphatic group, a substituted or unsubstituted $C_6$ to $C_{18}$ aromatic group, a $C_1$ to $C_8$ oxyalkyl group and a $C_6$ to $C_{18}$ oxyaryl group; m is an integer of 2 to 8; p is an integer of 0 to 4; s is an integer of 0 or 1; and X's and p's are respectively the same or different.

Formula (2):

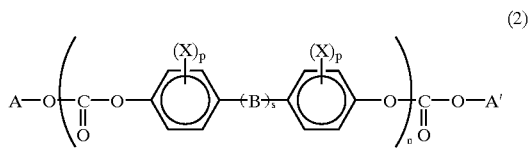

wherein A and A' are independently a monovalent group selected from the group consisting of a substituted or unsubstituted $C_1$ to $C_{18}$ aliphatic group and a substituted or unsubstituted $C_6$ to $C_{18}$ aromatic group, and may be the same or different; n is an integer of 1 to 7; and B, X, p and s have the same meanings as set forth in the above formula (1).

Formula (3):

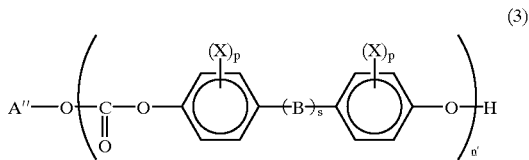

wherein A" is a monovalent group selected from the group consisting of a substituted or unsubstituted $C_1$ to $C_{18}$ aliphatic group and a substituted or unsubstituted $C_6$ to $C_{18}$ aromatic group; n' is an integer of 1 to 7; and B, X, p and s have the same meanings as set forth in the above formula (1).

It is considered that the linear oligomers represented by the formulae (2) and (3) are components obtained during the production of the polycarbonate as well as the cyclic oligomer represented by the formula (1). Accordingly, the specific structures of repeating units expressed in the parentheses of the formulae (1) to (3) are derived from the aromatic dihydroxy compounds used in the production of polycarbonate. Whereas, the terminal groups A, A' and A" are derived from either terminal groups of the compound capable of introducing a carbonate bond, or a terminal stopper used upon producing the polycarbonate by an interfacial polycondensation method using phosgene.

Since the cyclic oligomer represented by the formula (1) exhibits a high reactivity, the properties such as color tone or heat resistance of the obtained polycarbonate are adversely affected when the content of the cyclic oligomer is more than 1,000 ppm. However, even though the content of the cyclic oligomer is not more than 1,000 ppm, the properties of the obtained polycarbonate are sometimes adversely affected. More specifically, the properties of the polycarbonate become deteriorated in the case where the percentage of the content of the cyclic oligomer based on the total content of the cyclic oligomer and the specific linear oligomers represented by the formulae (2) and (3) is more than the value of $3.6 \times 10^{-8} \times (Mv)^2$, wherein Mv is a viscosity-average molecular weight of the obtained polycarbonate. The reason why the properties of the obtained polycarbonate are deteriorated under the above condition is considered such that the reactivity of the cyclic oligomer is high similarly to the case where the content of the cyclic oligomer is more than 1,000 ppm.

The above content and percentage of the cyclic oligomer produced are varied depending upon heat history of the polymer production process, kind and amount of the catalyst used, concentrations of the monomers or by-produced aromatic hydroxy compounds during the polymer production process, or the like, though the production mechanism of the cyclic oligomer is not clearly known. In order to form a certain molecular chain into a cyclic structure, it is necessary to react terminal groups of the molecular chain itself with each other. However, such a reaction is ordinarily difficult to occur. In general, terminal groups of adjacent molecules are reacted with each other in an initial stage of the polymerization. When the polymerization reaction further proceeds, only specific kinds of terminal groups remain in the reaction system. Under such a condition, the reaction between molecules is rather inhibited. As a result, it is considered that intramolecular reaction tends to be caused. Especially, in the case where the reaction system is maintained at a high temperature under such a condition that a less amount of terminal hydroxyl groups are present therein, the cyclic oligomer tends to be produced. Accordingly, it is preferred that the amount of the terminal hydroxyl groups be prevented from being extremely reduced. More specifically, in a final stage of the polymerization process which is conducted at a temperature of not less than 250° C., preferably not less than 260° C. in order to increase the molecular weight by 5 % or higher, the amount of terminal hydroxyl groups present at an inlet of the final polymerization apparatus is preferably not less than 100 ppm, more preferably not less than 200 ppm. In addition, when the amount of the catalyst used becomes large, the carbonate bond tends to be activated. As a result, it is considered that the reaction between terminal carbonate groups which is ordinarily difficult to occur tends to be caused, thereby producing the cyclic oligomer. Further, since the activation energy for the production of the cyclic oligomer is high, the higher the temperature the larger the amount of the cyclic oligomer produced. Therefore, the polymerization temperature is usually not more than 320° C., preferably not more than 310° C.

If only the content of the cyclic oligomer is to be reduced, it is possible to extract out the cyclic oligomer with a solvent such as hexane, heptane, methanol or acetone in which the polycarbonate is difficult to dissolve. However, when the cyclic oligomer is subjected to such an extraction to reduce the content thereof, the contents of other oligomers are also reduced, so that the percentage of the content of the cyclic oligomer based on the total. content of oligomers remains almost unchanged. In addition, there tends to be caused another adverse influence due to residual solvent after the extraction or the like. Thus, the extraction of the cyclic oligomer cannot necessarily improve the heat resistance of the obtained polycarbonate.

The respective contents of the oligomers represented by the formulae (1), (2) and (3) may be measured by various methods, for example, a gel permeation chromatography (GPC), a high performance liquid chromatography (HPLC), a mass spectrometry, nuclear magnetic resonance (NMR) or the like. However, when these measuring methods are used, it is usually required to separately treat high molecular weight moieties and low molecular weight moieties. Therefore, it is preferred to use measuring devices such as MALDI-TOFMS (Matrix Assisted Laser Desorption Ionization Time of Flight Mass Spectrometry) or the like, because whole contents of high to low molecular weight moieties can be measured at the same time.

In the production of the polycarbonate according to the present invention, the transesterification reaction using the above-described raw materials may be conducted in the form of a melt-polycondensation reaction at a temperature of 100 to 320° C. under ordinary pressure or reduced pressure while removing by-products such as aromatic hydroxy compounds. The above reaction may be usually carried out at two or more multiple stages which are different in temperature or pressure conditions from each other. The reaction temperature of each stage is not particularly restricted as long as the polymer can be maintained in a molten state under the above conditions. The reaction time of each stage can be appropriately determined depending upon the degree of progress of the reaction, but is preferably in the range of 0.1 to 10 hours. These conditions of each stage can be varied according to molecular weight and color tone of the obtained polymer, content of the cyclic oligomer, or the like. More specifically, the reaction of the first stage may be conducted at a temperature of usually 140 to 260° C., preferably 180 to 240° C. for usually 0.1 to 5 hours, preferably 0.5 to 3 hours under ordinary pressure or reduced pressure. Subsequently, the reaction temperature is increased from stage to stage while correspondingly reducing the pressure of the reaction system. At the final stage, the polycondensation reaction is conducted at a temperature of 240 to 320° C. under a reduced pressure of not more than 2 mmHg. In this case, it is preferred to keep the conditions of each reactor as unchangeable as possible so as to reduce the amount of the cyclic oligomer produced.

The melt-polycondensation reaction may be carried out by either continuous or batch method. In the present invention, the use of the continuous method is preferred from the standpoint of stability of the products. The preferred embodiment of the present invention will now be explained by referring to FIG. 1.

The apparatus used in the present invention may be of any type such as a tank type, a tube type or a column type. Specifically, there may be used vertical-type polymerization reactors 21 to 24 equipped with stirring blades 31 or 32, a single-screw or twin-screw horizontal-type polymerization reactor 5 equipped with stirring blades 6, or the like. The atmosphere of each high temperature reactor including a mixing tank 1 for raw materials is not particularly restricted, but the use of an inert gas atmosphere such as a nitrogen gas atmosphere is preferred from the standpoint of quality of the polymer produced.

After completion of the polymerization, the aromatic polycarbonate produced is usually recovered in the form of pellets. In this case, in order to remove low-molecular weight components such as residual monomers or by-products, the obtained aromatic polycarbonate may be passed through a vent-type extruder.

The aromatic polycarbonate according to the present invention may further contain various additives such as a thermal stabilizer, an ultraviolet light absorber, a mold-releasing agent, a colorant, an anti-static agent, a slip agent, an anti-blocking agent, a lubricant, an anti-fogging agent, natural oils, synthetic oils, waxes, organic fillers, inorganic fillers or the like. These additives may be added to a molten resin or a remolten resin produced by melting pelletized resin.

In the production process, the extruder which is ordinarily used at the highest temperature, is to be operated under moderate conditions in order to reduce the amount of cyclic oligomer produced. When the temperature is elevated under activated condition of the catalyst, the cyclic oligomer is produced. Therefore, it is preferred that the catalyst be deactivated using an appropriate deactivating agent.

In the case where any catalyst, especially an alkali metal compound catalyst is contained in the polycarbonate produced by the transesterification method, sulfur-containing acidic compounds or derivatives thereof may be suitably used as a deactivating agent for the catalyst. The deactivating agent may be added in an amount of usually 0.5 to 10 equivalents, preferably 1 to 5 equivalents based on one equivalent of the catalyst metal, i.e., in an amount of usually 1 to 100 ppm, preferably 1 to 20 ppm based on the polymer.

As the sulfur-containing acidic compounds or derivatives thereof, there may be exemplified sulfonic acid, sulfinic acid, sulfuric acid or esters thereof. Specific examples of the sulfur-containing acidic compounds or derivatives thereof may include dimethyl sulfate, diethyl sulfate, p-toluenesulfonic acid or methyl, ethyl, butyl, octyl or phenyl esters thereof; benzenesulfonic acid or methyl, ethyl, butyl, octyl, phenyl or dodecyl esters thereof; benzenesulfinic acid; toluenesulfinic acid; naphthalenesulfonic acid; or the like. Among these compounds, the use of p-toluenesulfonic acid esters or benzenesulfonic acid esters is preferred. Further, these sulfur-containing acidic compounds or derivatives thereof may be used singly or in the form of any two or more thereof.

The sulfur-containing acidic compounds or derivatives thereof may be added to the polycarbonate by an optional method. For example, the sulfur-containing acidic compounds or derivatives thereof may be added directly or after being diluted with a diluent, to molten or solid polycarbonate and then dispersed therein. More specifically, these compounds may be supplied to a polycondensation reactor, a transportation line from the reactor or an extruder, and mixed with polycarbonate therein. As a matter of course, the sulfur-containing acidic compounds or derivatives thereof may be preliminarily mixed with pellets, flakes or powder of polycarbonate using a mixer or the like, and then supplied to the extruder, etc., where the mixture is kneaded together. In addition, when the polycarbonate is treated under reduced pressure in the extruder by venting, when water is added to the polycarbonate, or when various additives such as a thermal stabilizer, a mold-releasing agent, dyes, pigments, an ultraviolet light absorber, an anti-static agent, an anti-fogging agent, organic or inorganic fillers or the like are added thereto, the sulfur-containing acidic compounds or derivatives thereof may be added to the polycarbonate simultaneously with the above treatment and the above addition of water or additives. However, it is preferred that the sulfur-containing acidic compounds or derivatives thereof be added to the polycarbonate and sufficiently kneaded therewith prior to the above treatment and addition.

EXAMPLES

The present invention will be described in more detail below by examples, but these examples are not intended to limit the scope of the present invention.

Various properties of the aromatic polycarbonates obtained in Examples and Comparative Examples described hereinafter were analyzed and measured by the following methods.

(1) Viscosity-average molecular weight:

The intrinsic viscosity [η] was measured at 20° C. in methylene chloride using an Ubbelohde viscometer, and the viscosity-average molecular weight (Mv) was obtained from the following formula:

$$[\eta] = 1.23 \times 10^{-4} \times (Mv)^{0.83}$$

(2) Oligomer content:

The oligomer content was measured using MALDI-TOFMS (VISION 2000, manufactured by Finnigan Mat Ltd.; laser: $N_2$ laser, 337 nm; mass-measuring range (m/z): 0 to 35,000). 0.10 g of polycarbonate and 0.01 g of tris(3, 5-di-t-butyl-4-hydroxybenzyl)isocyanurate as an internal standard were dissolved in 10 ml of dichloromethane to prepare a polymer solution, and 80 mg of 2,4,6-trihydroxyacetophenone was dissolved in 1 ml of THF to prepare a matrix solution. The thus-prepared polymer and matrix solutions were mixed together at a volume ratio of 1:1, and the obtained mixed solution was used as a sample solution.

(3) Color tone:

A 10% methylene chloride solution of polycarbonate was charged into a glass cell having a diameter of 25 mm and a height of 55 mm, and the tristimulus values XYZ thereof as absolute color values were measured using a color tester (SC-1-CH, manufactured by Suga Shikenki Co., Ltd.). The YI value as an index of yellowness was calculated from the following formula:

$$YI=100\times(1.28X-1.06Z)\div Y$$

The larger the YI value, the more the sample was colored.

(4) 360° C. heating test:

A polycarbonate resin was dried at 120° C. for 6 hours in a nitrogen atmosphere, and molded into a 3 mm-thick product as a 5th shot under the conditions of 360° C. and a residence time of 10 minutes, using an injection molding machine (J-100, manufactured by Nippon Seikosho Co., Ltd.). The tristimulus values XYZ of the obtained product were measured in the same manner as in the above (3) by a transmission method using a color tester (SC-1, manufactured by Suga Shikenki Co., Ltd.), and the YI value was calculated from the above formula.

(5) Amount of terminal hydroxyl groups:

Colorimetric determination was conducted by a titanium tetrachloride/acetic acid method (Macromol. Chem., 88, 215(1965)).

Example 1

Bisphenol A (BPA) and diphenyl carbonate (DPC) were melted and mixed together at a constant molar ratio (DPC/BPA=1.045) at a temperature of 135° C. in the mixing tank 1, and the obtained molten mixture was continuously introduced through a feed pipe heated to 135° C. into a first vertical-type agitated polymerization reactor 21 whose conditions were controlled to 205° C., an ordinary pressure and a nitrogen atmosphere. The opening degree of a valve provided on a polymer discharge line from the bottom of the first reactor was controlled such that the average residence time of the polymer therein was 70 minutes, thereby maintaining a constant liquid level in the reactor. Simultaneously with the initiation of feeding the above raw materials, an aqueous solution 7 of cesium hydroxide as a catalyst was continuously fed into the first reactor in an amount of $1 \times 10^{-6}$ mole based on one mole of bisphenol A.

The polymer solution discharged from the bottom of the first reactor was sequentially continuously fed into second, third and fourth vertical-type polymerization reactors 22 to 24 and fifth horizontal-type polymerization reactor 5. During the reaction, the liquid level of each reactor was controlled so as to obtain the average residence time as shown in Table 1. Simultaneously, phenol 4 by-produced was distilled off. Polymerization conditions of each of from the second vertical-type polymerization reactor 22 to the fifth horizontal-type polymerization reactor 5 and the amount of terminal hydroxyl groups at an inlet of the final stage polymerization reactor (i.e., an outlet of the fourth polymerization reactor 24 in this example) are also shown in Table 1. Polycarbonate continuously obtained at a production rate of 50 kg/hr was introduced while keeping a molten state thereof, into a twin-screw extruder equipped with a thermometer for measuring an inside temperature of a kneading portion thereof and provided with three-stage vent holes (manufactured by Kobe Steel Co., Ltd.; screw diameter: 0.046 m; L/D=36). Further, 5 ppm of butyl p-toluenesulfonate and then water were successively added to the extruder, and after removing volatile components, the mixture was pelletized. With respect to the extrusion conditions, the discharge amount was 50 kg/hr; the rotating speed was 150 rpm; and the maximum resin temperature was 278° C.

The obtained polycarbonate had a viscosity-average molecular weight of 22,000 and a cyclic oligomer (1) content of 400 ppm. Further, the percentage of the cyclic oligomer (1) content based on the total content of oligomers which was calculated from the above formula [I] was 13.7 %, and the YI value after 360° C. heating test was 4.9. The results of other evaluations are also shown in Table 1.

Example 2

The same procedure as defined in Example 1 was conducted except that the catalyst was changed to sodium hydroxide and the polymerization conditions were varied as shown in Table 1, thereby producing polycarbonate. The results of evaluation of the obtained polycarbonate are shown in Table 1.

Example 3

The same procedure as defined in Example 1 was conducted except that the catalyst was changed to cesium carbonate, the horizontal-type polymerization reactor was not used, and the polymerization conditions were varied as shown in Table 1, thereby producing polycarbonate. The results of evaluation of the obtained polycarbonate are shown in Table 1.

Comparative Example 1

The same procedure as defined in Example 1 was conducted except that the amount of the catalyst used was changed to $5 \times 10^{-6}$ mole and the polymerization conditions were varied as shown in Table 1 for achieving identical molecular weights, thereby producing polycarbonate. The results of evaluation of the obtained polycarbonate are shown in Table 1.

Comparative Example 2

The same procedure as defined in Example 2 was conducted except that the operating conditions of the extruder was changed as shown in Table 1, thereby producing polycarbonate. The results of evaluation of the obtained polycarbonate are shown in Table 1.

Comparative Example 3

The same procedure as defined in Example 3 was conducted except that the reaction conditions of the fourth vertical-type polymerization reactor was varied as shown in Table 1, thereby producing polycarbonate. The results of evaluation of the obtained polycarbonate are shown in Table 1.

TABLE 1

| Examples and Comparative Examples | Catalyst Kind | Catalyst Amount fed ($\mu$mol/mol-BPA) | Raw mixture DPC/BPA (molar ratio) |
|---|---|---|---|
| Example 1 | CsOH | 1 | 1.045 |
| Example 2 | NaOH | 1.5 | 1.04 |
| Example 3 | $Cs_2CO_3$ | 0.6 | 1.04 |
| Comparative Example 1 | CsOH | 5 | 1.1 |
| Comparative Example 2 | NaOH | 1.5 | 1.04 |
| Comparative Example 3 | $Cs_2CO_3$ | 0.6 | 1.04 |

| Examples and Comparative Examples | First vertical-type polymerization reactor Temp. (°C.) | First vertical-type polymerization reactor Residence time (min.) | Second vertical-type polymerization reactor Temp. (°C.) | Second vertical-type polymerization reactor Residence time (min.) | Second vertical-type polymerization reactor Degree of reduced pressure (Torr) |
|---|---|---|---|---|---|
| Example 1 | 205 | 70 | 205 | 60 | 95 |
| Example 2 | 205 | 70 | 220 | 60 | 100 |
| Example 3 | 220 | 70 | 220 | 60 | 120 |
| Comparative Example 1 | 205 | 70 | 205 | 60 | 120 |
| Comparative Example 2 | 205 | 70 | 220 | 60 | 100 |
| Comparative Example 3 | 220 | 70 | 220 | 60 | 120 |

| Examples and Comparative Examples | Third vertical-type polymerization reactor Temp. (°C.) | Residence time (min.) | Degree of reduced pressure (Torr) | Amount of terminal hydroxyl groups at outlet (ppm) |
|---|---|---|---|---|
| Example 1 | 240 | 60 | 15 | — |
| Example 2 | 245 | 60 | 15 | — |
| Example 3 | 245 | 60 | 15 | 1,650 |
| Comparative Example 1 | 240 | 60 | 18 | — |
| Comparative Example 2 | 245 | 60 | 15 | — |
| Comparative Example 3 | 245 | 60 | 15 | 1,650 |

| Examples and Comparative Examples | Fourth vertical-type polymerization reactor Temp. (°C.) | Residence time (min.) | Degree of reduced pressure (Torr) | Amount of terminal hydroxyl groups at outlet (ppm) |
|---|---|---|---|---|
| Example 1 | 250 | 60 | 0.5 | 1,100 |
| Example 2 | 255 | 60 | 0.4 | 1,320 |
| Example 3 | 280 | 90 | 0.5 | — |
| Comparative Example 1 | 250 | 60 | 0.5 | 330 |
| Comparative Example 2 | 255 | 60 | 0.4 | 1,320 |
| Comparative Example 3 | 330 | 30 | 0.6 | — |

| Examples and Comparative | Fifth horizontal-type polymerization reactor Temp. (°C.) | Residence time (min.) | Degree of reduced pressure (Torr) | Twin-screw extruder Discharge amount (kg/hr) | Twin-screw extruder Rotating speed (rpm) | Twin-screw extruder Maximum resin temp. (°C.) |
|---|---|---|---|---|---|---|
| Example 1 | 265 | 60 | 0.4 | 50 | 150 | 278 |
| Example 2 | 275 | 60 | 0.4 | 50 | 150 | 281 |
| Example 3 | — | — | — | 50 | 150 | 260 |
| Comparative Example 1 | 285 | 120 | 0.4 | 50 | 150 | 278 |
| Comparative Example 2 | 275 | 60 | 0.4 | 50 | 300 | 325 |
| Comparative Example 3 | — | — | — | 50 | 150 | 260 |

| Examples and Comparative Examples | Polymer produced Viscosity-average molecular weight (Mv) | Polymer produced Amount of terminal hydroxyl groups (ppm) | Polymer produced Color tone initial YI value |
|---|---|---|---|
| Example 1 | 22,000 | 390 | 1.5 |
| Example 2 | 22,200 | 570 | 1.6 |
| Example 3 | 15,900 | 550 | 1.2 |
| Comparative Example 1 | 22,000 | 85 | 2.2 |
| Comparative Example 2 | 21,700 | 660 | 2 |
| Comparative Example 3 | 15,900 | 610 | 1.8 |

| Examples and Comparative Examples | Polymer produced Content of oligomer (1) (ppm) | Polymer produced Content of oligomer (2) (ppm) | Polymer produced Content of oligomer (3) (ppm) |
|---|---|---|---|
| Example 1 | 400 | 1,930 | 600 |
| Example 2 | 410 | 1,680 | 560 |
| Example 3 | 530 | 4,250 | 1,680 |
| Comparative Example 1 | 610 | 2,390 | 130 |
| Comparative Example 2 | 1,200 | 4,440 | 920 |
| Comparative Example 3 | 660 | 4,780 | 1,030 |

| Examples and Comparative Examples | Polymer produced [ { (1) / (1) + (2) + (3) } ] × 100 | $3.6 \times 10^{-8} \times (Mv)^2$ (upper limit of formula [I]) | 360° C. test (YI value after residence) |
|---|---|---|---|
| Example 1 | 13.7 | 17.4 | 4.9 |
| Example 2 | 15.5 | 17.7 | 5.2 |
| Example 3 | 8.2 | 9.1 | 3.7 |
| Comparative Example 1 | 19.5 | 17.4 | 18 |
| Comparative Example 2 | 18.3 | 17 | 19 |
| Comparative Example 3 | 10.2 | 9.1 | 12 |

What is claimed is:

1. An aromatic polycarbonate which is produced by a transesterification reaction between an aromatic dihydroxy compound and a compound capable of introducing a carbonate bond, and has a viscosity-average molecular weight of 12,000 to 40,000 and a content of a cyclic oligomer represented by the following formula (1) of not more than 1,000 ppm, and in which the percentage of the content of said cyclic oligomer represented by the formula (1) based on the total contents of the oligomer represented by the formula (1), an oligomer represented by the following formula (2) and an oligomer represented by the following formula (3) satisfies the following relational formula [I]:

$$0 < \frac{(1)}{(1)+(2)+(3)} \times 100 < 3.6 \times 10^{-8} \times (Mv)^2 \quad [\text{I}]$$

wherein (1), (2) and (3) are contents of the oligomers represented by the above formulae (1), (2) and (3), respectively; and Mv is a viscosity-average molecular weight of said aromatic polycarbonate,

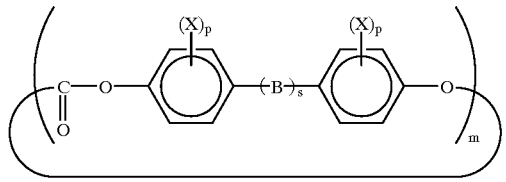

wherein B is a divalent group selected from the group consisting of a halogen-substituted or unsubstituted $C_1$ to $C_{15}$ hydrocarbon group, O, S, CO, SO and $SO_2$; X is a monovalent group selected from the group consisting of a halogen atom, a substituted or unsubstituted $C_1$ to $C_{14}$ aliphatic group, a substituted or unsubstituted $C_6$ to $C_{18}$ aromatic group, a $C_1$ to $C_8$ oxyalkyl group and a $C_6$ to $C_{18}$ oxyaryl group; m is an integer of 2 to 8; p is an integer of 0 to 4; s is an integer of 0 or 1; and X's and p's may be the same or different, respectively,

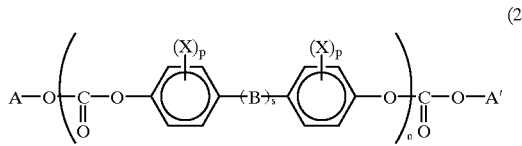

wherein A and A' are independently a monovalent group selected from the group consisting of a substituted or unsubstituted $C_1$ to $C_{18}$ aliphatic group and a substituted or unsubstituted $C_6$ to $C_{18}$ aromatic group, and may be the same or different; n is an integer of 1 to 7; and B, X, p and s have the same meanings as set forth in the above formula (1),

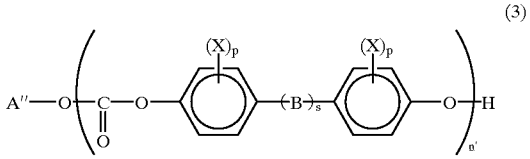

wherein A" is a monovalent group selected from the group consisting of a substituted or unsubstituted $C_1$ to $C_{18}$ aliphatic group and a substituted or unsubstituted $C_6$ to $C_{18}$ aromatic group; n' is an integer of 1 to 7; and B, X, p and s have the same meanings as set forth in the above formula (1).

2. An aromatic polycarbonate according to claim 1, which is produced by the transesterification reaction between said aromatic dihydroxy compound and a carbonic acid diester.

3. An aromatic polycarbonate according to claim 2, wherein said aromatic dihydroxy compound is 2,2-bis(4-hydroxyphenyl)propane, and said carbonic acid diester is diphenyl carbonate.

4. An aromatic polycarbonate according to claim 2 or claim 3, wherein the transesterification between said aromatic dihydroxy compound and said carbonic acid diester is carried out in the presence of a catalyst comprising alkali metal, alkaline earth metal or a mixture thereof in an amount of $1 \times 10^{-9}$ to $1 \times 10^{-4}$ mole based on one mole of said aromatic dihydroxy compound.

5. An aromatic polycarbonate according to claim 1, wherein the content of said cyclic oligomer represented by the formula (1) is not more than 700 ppm.

6. An aromatic polycarbonate according to claim 2, wherein the content of terminal hydroxyl groups is 100 to 1,000 ppm.

* * * * *